(12) United States Patent
Heninwolf et al.

(10) Patent No.: US 9,197,429 B1
(45) Date of Patent: Nov. 24, 2015

(54) REDUCING SIZE OF MULTICAST RETRY TRANSACTIONS

(71) Applicant: Google Inc., Mountain View, CA (US)

(72) Inventors: Paul Heninwolf, San Carlos, CA (US); Menno Marringa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 13/899,679

(22) Filed: May 22, 2013

(51) Int. Cl.
*H04W 28/00* (2009.01)
*H04L 12/18* (2006.01)
*H04W 4/08* (2009.01)

(52) U.S. Cl.
CPC ............. *H04L 12/1868* (2013.01); *H04W 4/08* (2013.01)

(58) Field of Classification Search
CPC ...... H04L 12/18; H04L 12/1868; H04W 4/08
See application file for complete search history.

(56) References Cited

U.S. PATENT DOCUMENTS

| 8,305,976 | B1 | 11/2012 | Vargantwar et al. |
| 8,351,434 | B1 | 1/2013 | Fukuda et al. |
| 2008/0031138 | A1 | 2/2008 | Okamasu et al. |
| 2008/0069002 | A1* | 3/2008 | Savoor et al. ................. 370/241 |
| 2011/0116435 | A1* | 5/2011 | Liu et al. ....................... 370/312 |
| 2013/0163596 | A1* | 6/2013 | Zhang ........................... 370/392 |

OTHER PUBLICATIONS

Stojmenovic et al.,"Dominating Sets and Neighbor Elimination-Based Broadcasting Algorithms in Wireless Networks", IEEE Transations on Parallel and Distributed Systems, vol. 13, No. 1, Jan. 2002.

* cited by examiner

*Primary Examiner* — John Blanton
(74) *Attorney, Agent, or Firm* — Morris & Kamlay LLP

(57) ABSTRACT

Disclosed are methods in which a source device that may multicast a message to a plurality of destination devices. The source device may receive an acknowledgement from less than all of the plurality of destination devices. Each acknowledgement may include an indication of the destination device from which the acknowledgement is received. A destination device may process the multicast message and generate an acknowledgement in response. In response to a time period subsequent to transmission of the multicast message, the source device may generate an updated message that indicates an acknowledgement status of each destination device associated with the group identifier from which an acknowledgement has been received.

15 Claims, 5 Drawing Sheets

| Step | |
|---|---|
| Multicasting, by a source device, a message to a plurality of destination devices identified by a group identifier | 110 |
| Receiving an acknowledgement from less than all of the plurality of destination devices | 120 |
| Comparing the individual identifier of the destination device to a list of device identifiers included under the group identifier | 130 |
| Identifying individual destination devices from which acknowledgements have not been received | 140 |
| Storing in an acknowledgement field memory indicators of identified individual destination device that need to provide acknowledgements | 150 |
| Generating, by the source device, an updated message that indicates an acknowledgement status of each destination device associated with the group identifier from which an acknowledgement has been received | 160 |

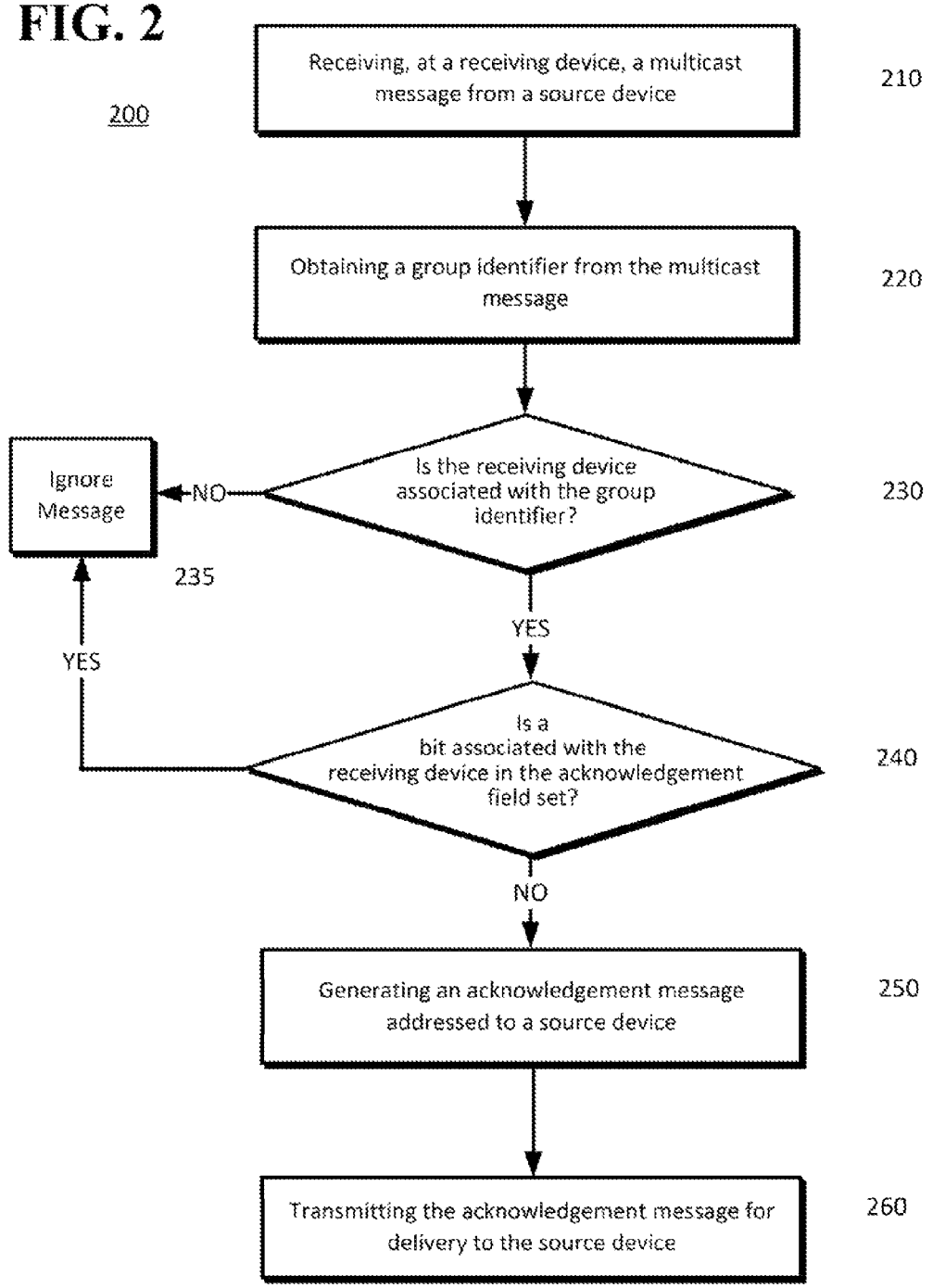

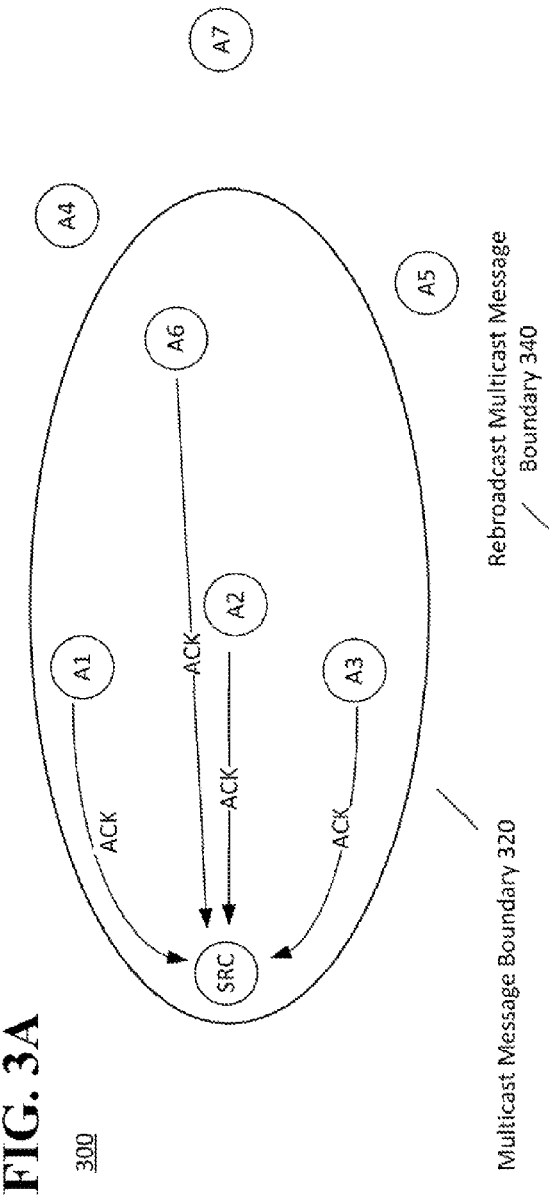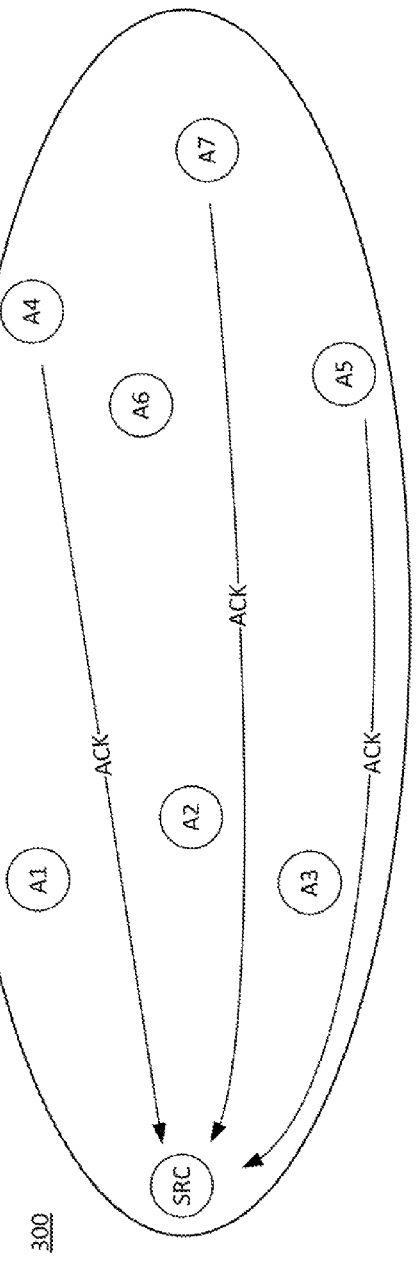
FIG. 3A
300
FIG. 3B
300

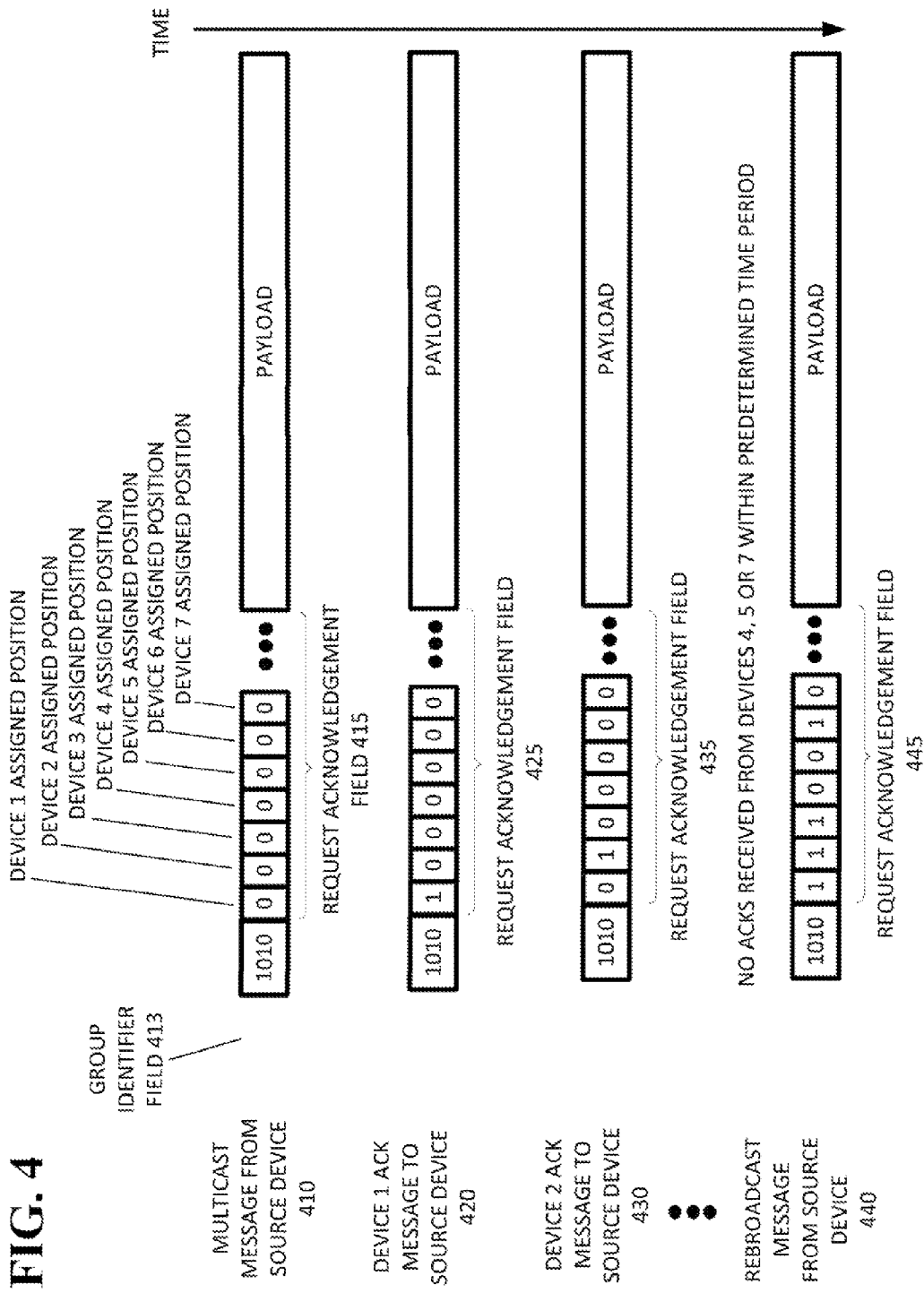

REDUCING SIZE OF MULTICAST RETRY TRANSACTIONS

BACKGROUND

Traditional multi-hop wireless networks may use acknowledge messages that travel through a sequential set of routing devices or point-to point links. As an example, a traditional wireless network may be configured such that an acknowledge frame may be generated as a result of the successful delivery of a message to a destination node D. The setup may require the acknowledge frame to be delivered to a source node S via three nodes C, B, and A. Accordingly, the configuration may transmit the acknowledge frame from the destination node D, to relay node C, to relay node B, to relay node A, and to the source node S, in order. Each node may receive address information regarding where a transmission or relay of the acknowledge frame by that node is intended to be delivered. Additionally, if the transmission from a node in the transmission chain fails to reach an intended node, the entire transmission process may fail. Alternatively, there are systems that may support single-hop multicast acknowledge messaging where the source can send multicast transmission to and receive acknowledge messages from its immediate neighbor and not to devices more than one hop away. However, the systems may send multiple unnecessary acknowledgements that may consume system bandwidth and processing resources.

BRIEF SUMMARY

According to an implementation of the disclosed subject matter, a method may include a source device that may multicast a message to a plurality of destination devices. The source device may receive an acknowledgement from less than all of the plurality of destination devices. Each acknowledgement may include an indication of the destination device from which the acknowledgement is received. In response to a time period subsequent to transmission of the multicast message, the source device may generate an updated message that indicates an acknowledgement status of each destination device associated with the group identifier from which an acknowledgement has been received.

According to an implementation of the disclosed subject matter, a receiving device may receive a multicast message from a source device. The receiving device may confirm that an acknowledgement status indicator indicates that the receiving device must generate an acknowledgement. In response to the confirmation, the receiving device may generate an acknowledgement message addressed to the source device. The acknowledgement message may be transmitted for delivery to the source device.

The disclosed implementations may provide for an efficient use of bandwidth by reducing the number of acknowledgment messages that may be transmitted across the network. In addition, destination or receiving devices may not need to maintain a list of groups to which the device belongs. Additional features, advantages, and implementations of the disclosed subject matter may be set forth or apparent from consideration of the following detailed description, drawings, and claims. Moreover, it is to be understood that both the foregoing summary and the following detailed description includes examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 1 shows a flow chart according to an implementation of the disclosed subject matter.

FIG. 2 shows a flow chart according to an implementation of the disclosed subject matter.

FIGS. 3A and 3B show an example visualization of a message transmission process according to an implementation of the disclosed subject matter.

FIG. 4 shows an example visualization of a data packet according to an implementation of the disclosed subject matter.

DETAILED DESCRIPTION

Figure 5:
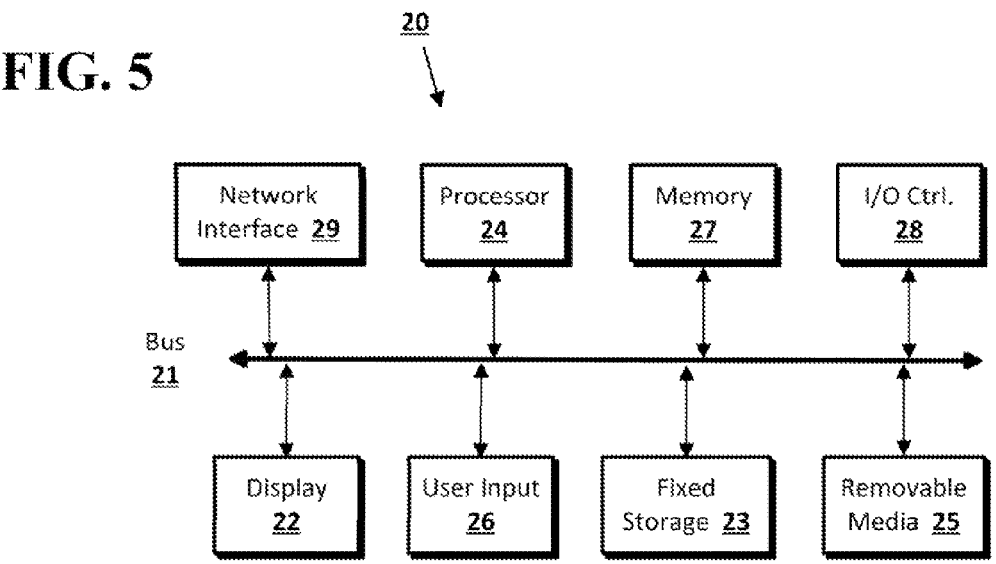
FIG. 5 shows an example computer according to an implementation of the disclosed subject matter.

In an implementation, a multicast message may include, for example, an additional data field, a request acknowledgement field, that includes indicators related to whether a device has responded with an acknowledgement message to an earlier multicast message. The request acknowledgement field may indicate the specific subset of devices within the group that actually need to send acknowledgments to the source device. For example, a source device may need to contact a plurality of devices to perform a certain action or request data from the plurality of devices. The plurality of devices may be assigned to a group that is identified with a group identifier. The source device may multicast a message to a plurality of destination devices identified by the group ID. A destination device in the group ID may process the message based on the indicators in the request acknowledgement field. For example, if the indicators indicate that an acknowledgement from the destination device is requested by the source, the destination device may generate an acknowledgement message with an updated request acknowledgement field. Although the foregoing implementation includes multicast messaging, the disclosed subject matter can also be used in unicast and broadcast systems, subsystems and processes.

FIG. 1 shows a flow chart according to an implementation of the disclosed subject matter. The illustrated process 100 may be implemented in a network in which individual devices may communicate with a plurality of other devices. For example, an individual device may be a "smart" wall switch and the plurality of devices may be a number of "smart" light bulbs or "smart" light fixtures surrounding a perimeter of a residence. A source device may multicast a message to the plurality of destination devices, such as the aforementioned smart light bulbs (Step 110). Devices and any other devices that interoperate with one another may be assigned to a group identified by a group identifier. Each device may have a unique, individual device identifier. The multicast message may include a group identifier, which may be a numerical or alphanumeric value (or be in any other suitable format), for identifying the group of devices. The group identifier may uniquely identify a set of devices that includes the plurality of destination devices. The group identifier may be set by a user or automatically by a processor, for example, when the group of devices is formed. A plurality of destination devices may be assigned to a group that may be identified by a group identifier. For example, a group of devices may include perimeter lights that illuminate an area surrounding a structure, or a series of devices that operate to dim lights and close blinds. For example, a next number in a sequence, such as "6212000," or a logical name based on a location of the devices, such as "exterior perimeter lights," may be assigned by a processor or a user to the group. Each device may be provided with the group identifier of which it is a member. For example, device "0001" may have stored in, or have access to, data storage that may include a list of groups to which the device is assigned.

The multicast message may also have a data field for listing the specific device in the respective group. In an implementation, the data field may be called a request acknowledgement field. Each group may have a specific arrangement of devices in a request acknowledgement field, which may be at set up by a user or upon commissioning of the device in the network. For example, the devices may be listed in numerical or alphabetical order. Each device may be assigned a specific bit position in the request acknowledgement field. For example, the assigned position in the request acknowledgement field may always be the same for the device no matter the group to which the device is assigned. For example, a request-acknowledgment field, having bit positions assigned to each of the plurality of devices in the network. For a particular application, the request acknowledgement field may be a 128-bit field in which device number 1 may be assigned bit number 1, device number 2 assigned bit number 2, and so on. Or, the device with the lowest numbered identifier, such as "001" may be the first few bits of the request acknowledgement field. Of course, the request acknowledgement field may be a field of different bit sizes, such as 32, 64, 256 or the like may be used. The request acknowledgement field in an initial, multicast message may be broadcast with all zeroes (or 1 s) indicating that none of the devices have yet acknowledged a message from the source.

Returning to FIG. 1, an acknowledgement may be received from less than all of the plurality of destination devices (Step 120). Each acknowledgement may include an indication of the destination device from which the acknowledgement is sent. The indication may identify the destination device uniquely from other devices included in the group identifier. For example, when the destination device generates an acknowledgement message, the device may set a bit in its assigned bit position in the request acknowledgement field indicating that an acknowledgement has been sent from the particular device. The setting of a bit value in a specific position of the data field assigned to the destination device may provide the acknowledgement. The acknowledgement message may be received and processed by the source device, for example, by parsing the acknowledgement message from the individual destination device to obtain the acknowledgement indication at a particular bit location. Or, in the case, in which individual identifier of the destination device are included in the acknowledgement messages, the individual identifier may be parsed from the acknowledgment message. A list of devices from which indicators or identifiers were obtained from may be stored in memory according to identifiers related to the acknowledging devices by the source device. The memory may be a local or remote memory.

Based on the received acknowledgements, the source device may verify that each of the plurality destination devices included in the group identifier has responded with an acknowledgement. The verification may be performed using various processes. For example, a source device processor may obtain a list of individual destination device identifiers that have provided acknowledgements from a memory device. And, in a specific example, the list of individual destination device identifiers that have provided acknowledgements may be inverted and may be compared with the list of individual destination device identifiers included in the respective group identifier. Based on the results of the comparison, individual destination devices from which acknowledgements have not been received may be identified (140). Of course other methods of determining which devices in a group have not sent acknowledgements may be used. An acknowledgement field memory may be used to store identifiers of identified individual destination devices that need to provide acknowledgements (150).

A source device may wait a predetermined time period, such as 0.10-10 milliseconds for the destination devices that are the intended recipients of the multicast message to respond with an acknowledgement message. After the predefined time period subsequent to the multicasting, the source device may generate a updated message using the indications or device identifiers parsed from any acknowledgments received by the source device (160). For example, the multicast message sent prior to the updated message may indicate in the request acknowledgment field that each destination device associated with the group identifier has not provided an acknowledgement to the source. Based on any received acknowledgements, the updated message may indicate an updated acknowledgement status of each destination device associated with the group identifier from which an acknowledgement has been received.

The updated acknowledgement status for each of the plurality of destination devices may be included as an indication of a specific bit value in a specific position in the updated message for the group identifier. Alternatively, the updated message may include a list, for example, in the form of a data field, of individual destination device identifiers as an indication of the acknowledgement status of the respective individual destination devices.

FIG. 2 shows a flow chart according to an implementation of the disclosed subject matter. The process 200 is a process that may be followed by a receiving device in response to receiving a multicast message from a source device as described with respect to FIG. 1. The process 200 may begin with a receiving device receiving a multicast message from a source device (210). A processor at the receiving device may obtain a group identifier from the multicast message (220). The group identifier may be similar to the group identifier described above with reference to FIG. 1. For example, the group identifier may identify a group of destination devices that are the intended recipients of the message. At decision 230, it may be determined, for example, by the receiving device processor, whether the receiving device is or is not associated with the group identifier. The determination may be made, for example, by the processor parsing the received message to locate the group identifier in the message, and the processor may compare the group identifier parsed from the message to a list of group identifiers to which the receiving device is assigned. If the determination is NO, the receiving device is not associated with the group identifier based on the comparison results, the process 200 may proceed to step 235 and the message may be ignored. If the determination is YES, the receiving device is a destination device based on the comparison results, the process 200 may continue to step 240.

Alternatively, instead of performing steps 220 and 230, the receiving device may proceed directly from step 210 to step 240. For example, a source device may know the individual device identifiers of the receiving devices that are assigned to a group, and may set the bits in the request acknowledgment field to indicate that those devices are to respond with an acknowledgment message. For example, devices 1, 10 and 100 may form the group of devices that the source intends to send a message. The request acknowledgement field of the message from the source may only have bits set requesting an acknowledgement from devices 1, 10 and 100. Upon receipt of the message, receiving devices 1, 10 and 100 may perform step 240 of the process 200 as explained in the following paragraph. The receiving devices 1, 10 and 100 may also be referred to as "destination devices" since the devices are intended recipients of the message.

At step 240, the receiving (or destination) device processor may check an acknowledgement status indicator in the request acknowledgement field for the respective device set, for example, to a logic HIGH or LOW. If the processor confirms that the bit is set (YES, an acknowledgement is required) indicates that the destination device must generate an acknowledgement. This may be accomplished by, for example, analyzing the bit position in a request acknowledgement field assigned to the respective destination device. If the processor confirms that the bit is not set (NO, an acknowledgement is not required), the process 200 may proceed to step 250. At step 250, the destination device processor may generate an acknowledgement message addressed to the source device. The acknowledgement message may include a bit set to an opposite value as the prior message in the bit position assigned to the destination device in the request acknowledgement field. The receiving (destination) device may transmit an acknowledgement message for delivery to the source device (260).

FIGS. 3A and 3B show an example visualization of a message transmission network process according to an implementation of the disclosed subject matter. The system 300 may include a source device SRC and several other devices A1-A7. The source device SRC may be, for example, a wall switch, and the several other devices A1-A7 may be light fixtures or light bulbs. Each of the devices A1-A7 may be grouped together and assigned to a group identifier. In FIG. 3A, devices A1-A3 and A6 are shown responding with acknowledgement (ACK) messages to a multicast message generated by the source (SRC) device. The multicast message boundary 320 may be a conceptual boundary to indicate that devices A4, A5 and A7 did not receive the multicast message, even though they were among the intended recipients. Since these devices didn't receive the message, the source device SRC did not receive an ACK message from them. A reason for a device (destination or source) not receiving the message may be, for example, interference from weather, network congestion, saturation of the devices due to message traffic from other sources, a power outage or an occurrence of some other interfering event.

As explained above with respect to FIG. 1, the source device SRC may receive the ACK signals, and may generate a updated message. The updated message as discussed above may indicate that devices A1-A3 and A6 have responded with an ACK message and that ACK messages have not been received from devices A4, A5 and A7. As shown in FIG. 3B, the updated message boundary 340 extends to include all of devices A1-A7. Each of the devices A1-A7 may parse the received message as described above with respect to FIG. 2. All of devices A1-A7 are shown to have received the updated message due to their inclusion within the updated multicast message boundary 340. FIG. 3B shows only devices A4, A5 and A7 responding with an ACK message because those devices may be the only devices required to respond with an ACK message due to their earlier failure to receive the multicast message or have their ACK successfully delivered to the source device SRC.

Alternatively, the multicast message may include a list of device identifiers of the devices that are the destination of the message. For example, the list may include devices A1-A7. The receiving devices (in FIG. 3A, devices A1-A3 and A6) may parse the multicast message for their respective device identifiers to determine if it is a destination device. If the respective receiving device is a destination device, it may generate an acknowledgement message (as did devices A1-A3 and A6) that may include the destination device identifier. The source device may receive an acknowledgement signal from a destination device, and may store the destination device's identifier in a memory. The source device may, for example, also maintain a count of the acknowledgements to compare to the number of devices in a respective group. The source device may determine whether all of the destination devices in the group have responded with an acknowledgement. If all of the destination devices do not respond with an acknowledgement within a predefined time period, the source device may generate a updated message. The content of the updated message may include the earlier message and either a list of device identifiers that have or a list of devices that have not acknowledged the earlier message. The source device may transmit the updated message. Destination devices that receive the updated message may parse the message to determine if its identifier is not or is listed. If the identifier is not listed, the destination device may generate an acknowledgement message. Otherwise, the destination device may ignore the message. Alternatively, if the list includes devices that have not responded with an acknowledgement, and the receiving device finds its identifier in the list, it may generate an acknowledgement. Otherwise, it may ignore the message. Accordingly, network traffic is minimized because extraneous acknowledgement messages are not generated.

FIG. 4 illustrates an example data packet according to an implementation of the presently disclosed subject matter. The example data packet 410 may include a preamble (not shown), a header (not shown), a group identifier field 413, a request acknowledgment field 415 and a payload. Other fields may be included, such as a updated indication field, which may indicate that the message is a updated of a previous message, but for ease of explanation only the group identifier 413, request acknowledgement field 415 and the payload are shown. The group identifier field 413 may be a multi-bit field that identifies the group of devices to which the message is intended to be delivered. The request acknowledgement field 415 may include a number of bits that is equal to the number of devices in a home network, for example, 25 devices, or the maximum capacity of devices used in a network, for example, 128. The payload may be a command or other data that is to be communicated to the group of devices.

Using the example from FIGS. 3A and 3B as a reference, a multicast message 410 may be broadcast to a number of devices that are assigned to the group identifier 413. In this example, the group identifier 413 may be, for example, a four-bit value. Of course, other bit values may be used depending upon the number of groups that can be managed by a controller. The request acknowledgement field 415 may also be a multi-bit field. The number of bits in the request acknowledgement field 415 may correspond to the number of individual devices that can be managed by a controller. Continuing with the example from FIGS. 3A and 3B, the group identifier may be for a group of devices that includes only device A1-A7, and the first seven bits of the request acknowledgement field 415 may correspond to devices A1-A7. For example, the acknowledgement status of device A1 may be assigned to device 1 assigned position, device A2 may be assigned to device 2 assigned position, and so on with each of remaining devices A3-A7 assigned to respective positions shown by device 3 assigned position to device 7 assigned position. There may be other bit positions available, but since the group identifier pertains to only devices A1-A7, the other bit positions are not shown.

When a source device, such as source SRC of FIGS. 3A and 3B, sends a multicast message, the message may have the form of multicast message 410 in FIG. 4. Message 410 may include the group identifier 413, the request acknowledgement field 415 and the payload. As mentioned above, the group identifier 413 may identify the intended group of devices that are to receive the multicast message 410. In the acknowledgement request field 415, all of the bits are set to the same value since all devices in the group are requested to return acknowledgements of the message. FIG. 3A shows devices A1-A3 and A6 returning acknowledgement (ACK) messages to the source SRC device. The acknowledgement messages sent by devices A1 and A2 may be configured similar to messages 420 and 430 of FIG. 4. For example, the request acknowledgement field 425 of message 420 may have a bit set in the device 1 assigned position, which may be the bit position assigned to device A1. Similarly, the request acknowledgement field 435 of message 430 may have a bit set in the device 2 assigned position, which may be the bit position assigned to device A2. The source device SRC may receive the acknowledgement messages 420 and 430 and process, such as a logical OR operation, the set bit positions in the request acknowledgement field in comparison to the originally sent message. The updated message 440 may include a request acknowledgement field that has set bits in the positions of the devices that responded with an acknowledgement. The updated message 440 may include bit settings indicating which devices may need to respond with an acknowledgement. For example, referring back to FIG. 3A, acknowledgements have not been received by the source device SRC from devices A4, A5 and A7 within a predetermined time period, such as 10 milliseconds, or whichever time period is suitable for allowing each device in the group to respond to the source device SRC. The updated message 440 may include set bits in assigned positions for device 4, device 5 and device 7. The updated message 440 may be transmitted to all devices A1-A7. Devices A4, A5 and A7 may parse the updated message and respond with an acknowledgement message ACK. Meanwhile, devices A1-A3 and A6 may receive the updated message and parse the message as described above, but because the request acknowledgement field has bits set that indicate an acknowledgement message is not required, no acknowledgement message is generated by the respective devices A1-A3 and A6.

Of course, the request acknowledgement field may be configured differently. For example, the bit settings in the request acknowledgment field may initially be set to HIGH and when a device generates an acknowledgement may change the setting to LOW. Alternatively, for example, only the updated message may include a request acknowledgment field, and the receiving device may set a bit indicating that an acknowledgement has been generated.

Implementations of the presently disclosed subject matter may be implemented in and used with a variety of component and network architectures. FIG. 5 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
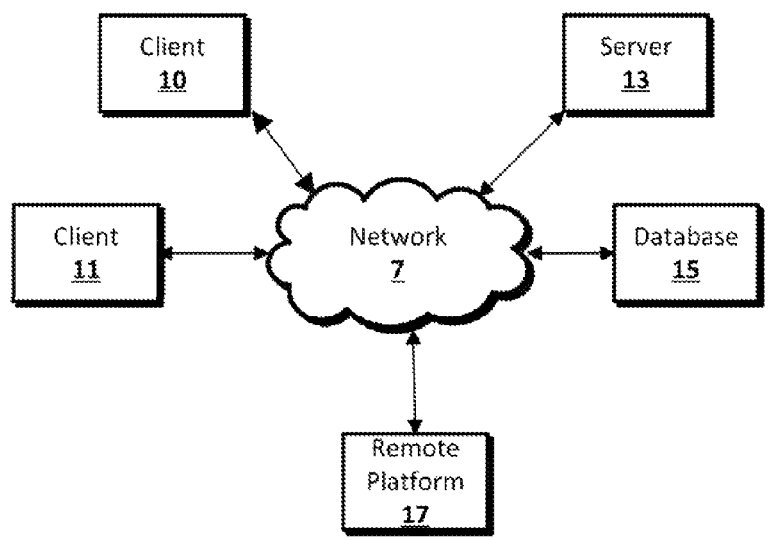
FIG. 6 shows a network configuration according to an implementation of the disclosed subject matter.

FIG. 6 shows an example network arrangement according to an implementation of the disclosed subject matter. One or more clients 10, 11, such as smart devices, for example, smart light fixtures, light bulbs, televisions, appliances, audio devices, wall switches, local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
assigning a bit location in a bit field to each of a plurality of destination devices;
multicasting, by a source device, a message to the plurality of destination devices, the message comprising a group identifier that identifies the plurality of destination devices;
receiving acknowledgements from less than all of the plurality of destination devices, each acknowledgement including a bit value in the assigned bit location in the bit field for the destination device from which the acknowledgement is received; and
after multicasting the message, generating, by the source device, an updated message that indicates an acknowledgement status of each of the plurality of destination devices, the updated message including the group identifier.

2. The method of claim 1, wherein the acknowledgement status for each of the plurality of destination devices is indicated by a specific bit value in a specific position in the updated message.

3. The method of claim 1, wherein the updated message includes a list of individual destination device identifiers as an indication of the acknowledgement status of the respective individual destination device.

4. The method of claim 1, further comprising:
verifying that each of the plurality destination devices has responded with an acknowledgement.

5. The method of claim 1, further comprising:
comparing an individual identifier of the destination device to a list of device identifiers included under the group identifier; and
in response to the comparison, populating an acknowledgement field for inclusion in the updated message with a listing of individual destination device identifiers that need to provide acknowledgements.

6. The method of claim 1, further comprising:
obtaining a list of individual destination device identifiers that have provided acknowledgements from a memory;
inverting the list of individual destination device identifiers that have provided acknowledgements;
comparing the inverted list with the list of individual destination device identifiers included in the group identifiers; and
identifying individual destination devices from which acknowledgements have not been received.

7. The method of claim 1, wherein an individual destination device identifier uniquely identifies a destination device of the plurality of destination devices within the group of devices identified by the group identifier.

8. The method of claim 1, wherein the group identifier uniquely identifies a set of devices that includes the plurality of destination devices.

9. The method of claim 1, further comprising:
parsing the acknowledgement message received from an individual destination device to obtain an individual identifier of the destination device.

10. The method of claim 1, wherein the multicast message sent prior to the updated message indicates the acknowledgement status of each destination device associated with the group identifier as having not provided an acknowledgement.

11. A method, comprising:
assigning a bit location in a bit field to a receiving device;
receiving, at the receiving device, a multicast message from a source device, the message comprising a group identifier that identifies the receiving device and a bit value in the assigned bit location in the bit field;
confirming that an acknowledgement status indicator indicates that the receiving device must generate an acknowledgement;
in response to the confirmation, generating an acknowledgement message addressed to the source device, the acknowledgement including a bit value in the assigned bit location in the bit field for the receiving device; and
transmitting the acknowledgement message for delivery to the source device.

12. The method of claim 11, further comprising:
  obtaining the group identifier from the multicast message; and
  determining that the receiving device is associated with the group identifier.

13. The method of claim 11, wherein the confirming occurs in response to a determination that the receiving device is associated with the group identifier.

14. The method of claim 11, wherein the confirming that the receiving device is associated with the group identifier comprises:
  comparing an individual identifier of the receiving device to a list of device identifiers included under the group identifier; and
  in response to the comparison, populating an acknowledgement field for inclusion in an updated message with a bit setting indicating that the respective receiving device identifiers indicating that an acknowledgement has been transmitted.

15. The method of claim 11, wherein the group identifier identifies a group of receiving that are the intended recipients of the message.

* * * * *